(12) United States Patent
Kwak et al.

(10) Patent No.: US 11,482,024 B2
(45) Date of Patent: Oct. 25, 2022

(54) ELECTRONIC DEVICE AND METHOD FOR PROCESSING WRITING INPUT

(71) Applicant: Samsung Electronics Co., Ltd., Gyeonggi-do (KR)

(72) Inventors: Taewon Kwak, Gyeonggi-do (KR); Dohyeon Kim, Gyeonggi-do (KR); Jungrim Kim, Gyeonggi-do (KR); Jihoon Kim, Gyeonggi-do (KR); Gibeyong Park, Gyeonggi-do (KR); Jeongwan Park, Gyeonggi-do (KR); Konsang Lee, Gyeonggi-do (KR); Donghyuk Lee, Gyeonggi-do (KR); Seungcheol Lee, Gyeonggi-do (KR); Yeunwook Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 17/117,286

(22) Filed: Dec. 10, 2020

(65) Prior Publication Data
US 2021/0174075 A1    Jun. 10, 2021

(30) Foreign Application Priority Data
Dec. 10, 2019  (KR) .......................... 10-2019-0163763

(51) Int. Cl.
*G06F 3/0354*   (2013.01)
*G06F 3/0488*   (2022.01)
(Continued)

(52) U.S. Cl.
CPC ........ *G06V 30/347* (2022.01); *G06F 3/03545* (2013.01); *G06F 3/04883* (2013.01); *G06V 30/36* (2022.01)

(58) Field of Classification Search
CPC .. G06V 30/347; G06V 30/36; G06F 3/03545; G06F 3/04883
See application file for complete search history.

(56) References Cited

U.S. PATENT DOCUMENTS

| | | | |
|---|---|---|---|
| 4,653,107 A * | 3/1987 | Shojima | G06K 9/62 382/189 |
| 5,615,285 A * | 3/1997 | Beernink | G06V 30/373 382/290 |

(Continued)

FOREIGN PATENT DOCUMENTS

| | | | |
|---|---|---|---|
| JP | | 6055065 B1 | 12/2016 |
| KR | 10-2008-0086460 A | | 9/2008 |

(Continued)

OTHER PUBLICATIONS

International Search Report dated Apr. 1, 2021.

*Primary Examiner* — Daeho D Song
(74) *Attorney, Agent, or Firm* — Cha & Reiter, LLC

(57) ABSTRACT

An electronic device and method are disclosed. The electronic device includes a touch-sensitive display, a memory and a processor. The processor implements the method, including: detect a written input including a plurality of strokes through the display, group the plurality of strokes into a first group and a second group based on respective coordinates of each of the plurality of strokes, group first strokes included in the first group into a plurality of blocks, based on a distance between respective coordinates of each of the first strokes, determine a slope for each of the plurality of blocks, rotate an area corresponding to the first group based on the determined slope, execute handwriting recognition on the first strokes based on the rotated area, and displaying a result of the handwriting recognition on the display.

18 Claims, 16 Drawing Sheets

(51) Int. Cl.
   *G06K 9/00*         (2022.01)
   *G06V 30/32*        (2022.01)
   *G06F 3/04883*      (2022.01)

(56) References Cited

U.S. PATENT DOCUMENTS

| | | | | |
|---|---|---|---|---|
| 5,903,668 | A * | 5/1999 | Beernink | G06V 30/373 |
| | | | | 382/187 |
| 7,620,244 | B1 * | 11/2009 | Collier | G06V 40/382 |
| | | | | 382/119 |
| 9,373,049 | B1 * | 6/2016 | Worley | G06V 30/347 |
| 9,524,440 | B2 * | 12/2016 | Wimmer | G06V 10/42 |
| 9,621,219 | B1 * | 4/2017 | Richmond | H04M 1/72409 |
| 10,346,035 | B2 * | 7/2019 | Xia | G06F 3/0482 |
| 10,614,300 | B2 * | 4/2020 | Kelso | G06F 40/103 |
| 10,748,031 | B1 * | 8/2020 | Binford | G06V 30/153 |
| 10,949,660 | B2 * | 3/2021 | Wang | G06V 30/333 |
| 11,017,258 | B2 * | 5/2021 | Gur | G06F 3/04845 |
| 2003/0215136 | A1 * | 11/2003 | Chao | G06V 30/1478 |
| | | | | 382/176 |
| 2004/0141648 | A1 * | 7/2004 | Dodge | G06F 3/04883 |
| | | | | 382/188 |
| 2004/0165774 | A1 * | 8/2004 | Koubaroulis | G06V 30/333 |
| | | | | 382/179 |
| 2005/0100217 | A1 * | 5/2005 | Abdulkader | G06V 30/2455 |
| | | | | 382/186 |
| 2005/0163377 | A1 * | 7/2005 | Walch | G06V 40/30 |
| | | | | 382/187 |
| 2007/0003142 | A1 * | 1/2007 | Simard | G06V 30/347 |
| | | | | 382/187 |
| 2008/0231635 | A1 * | 9/2008 | Saund | G06V 30/414 |
| | | | | 345/619 |
| 2008/0253659 | A1 * | 10/2008 | Walch | G06V 10/40 |
| | | | | 382/186 |
| 2008/0292190 | A1 * | 11/2008 | Biswas | G06F 3/04883 |
| | | | | 382/187 |
| 2013/0242021 | A1 * | 9/2013 | Hasegawa | B41J 2/32 |
| | | | | 347/171 |
| 2016/0162174 | A1 * | 6/2016 | Tsutsui | G06F 3/04883 |
| | | | | 345/173 |
| 2017/0117930 | A1 * | 4/2017 | Richmond | G06F 3/03545 |
| 2018/0018774 | A1 * | 1/2018 | Kacher | G06V 10/56 |
| 2018/0293435 | A1 * | 10/2018 | Wang | G06V 10/32 |
| 2019/0325211 | A1 * | 10/2019 | Ordonez | G06V 30/414 |
| 2020/0065601 | A1 * | 2/2020 | Andreassen | G06V 30/347 |

FOREIGN PATENT DOCUMENTS

| | | |
|---|---|---|
| KR | 10-2015-0024107 A | 3/2015 |
| KR | 10-2021-0017063 A | 2/2021 |

* cited by examiner

Hello

Hello    May 22

It's My birthday

May 22th is My birthday

Ms. Min-young 010.2045.8204

FIG.10

ELECTRONIC DEVICE AND METHOD FOR PROCESSING WRITING INPUT

CROSS-REFERENCE TO RELATED APPLICATION(S)

This application is based on and claims priority under 35 U.S.C. 119 to Korean Patent Application No. 10-2019-0163763, filed on Dec. 10, 2019, in the Korean Intellectual Property Office, the disclosure of which is herein incorporated by reference in its entirety.

BACKGROUND

1) Field

Various embodiment disclosed herein relate to an electronic device and a method for processing a slanted writing input

2) Description of Related Art

Electronic devices, such as smartphones, tablet PCs, and wearable smart devices, may provide various functions, such as music playback, navigation, short-range wireless communication (e.g. Bluetooth, Wi-Fi, or near-field communication (NEC)), a fingerprint recognition, image capture(or still image), video capture (video recording), and facilitating electronic payments.

Some user equipment may recognize a writing input manually entered using an electronic pen. For example, the electronic device may include an input device that detects the approach and touch of a user's finger or an electronic pen, and may recognize handwriting input by application of the finger or pen to the input device.

The electronic device may store the recognized writing input in the form of an image, or may convert the recognized writing input into text for additional processing. To convert the recognized writing input into text, the electronic device may use a text recognition algorithm able to account for unique characteristics of user handwriting.

The above information is presented as background information only to assist with an understanding of the disclosure. No determination has been made, and no assertion is made, as to whether any of the above might be applicable as prior art with regard to the disclosure.

SUMMARY

In handwriting recognition, a conventional electronic device may perform line separation on text based on the assumption of a horizontal writing input. Thus, when a plurality of sentences are input at a slant, the electronic device has difficulty in accurately recognizing each sentence. When the user inputs slanted handwriting including a plurality of lines, because slanted handwriting is not separately considered by the electronic device, a problem and/or inconvenience may arise resulting in errors, in that sentences and/or text become unrecognizable by the device due to limitations of detecting separations between different lines of text.

Certain embodiments disclosed herein may provide a writing recognition method that enables detection of handwritten input in a plurality of lines, even when the sentences are input at a slant. For example, one embodiment of the invention may allow detection of individual lines and text even when the sentences are slanted at up to 80 degrees, resulting in a successful recognition rate of 90% or higher, by performing preprocessing accounting for characteristics of the handwriting, and an electronic device supporting the same.

An electronic device according to an embodiment may include: a display, a memory configured to store instructions, and at least one processor electrically connected to the display and the memory, wherein, the stored instructions are executable by the at least one processor to cause the electronic device to: detect a written input including a plurality of strokes through the display, group the plurality of strokes into a first group and a second group based on respective coordinates of each of the plurality of strokes, group first strokes included in the first group into a plurality of blocks, based on a distance between respective coordinates of each of the first strokes, determine a slope for each of the plurality of blocks, rotate an area corresponding to the first group based on the determined slope, execute handwriting recognition on the first strokes based on the rotated area, and displaying a result of the handwriting recognition on the display.

A method for recognizing a slanted writing input by an electronic device according to an embodiment may include: detecting, through display, a handwritten input including a plurality of strokes, grouping, by a processor, the plurality of strokes into a first group and a second group based on respective coordinates of each the plurality of strokes, grouping first strokes included in the first group from among the plurality of strokes into a plurality of blocks based on a distance between coordinates of each of the respective first strokes, determining a slope for each of the plurality of blocks, rotating an area corresponding to the first group based on the determined slope; and executing handwriting recognition on the first strokes based on the rotated area.

An electronic device according to an embodiment may include: a display, a memory storing instructions, an electronic pen detectable by the electronic device, and at least one processor electrically connected to the display and the memory, wherein the instructions are executable by the at least one processor to cause the electronic device to: detect a written input including a plurality of strokes via the electronic pen, group the plurality of strokes into a plurality of blocks based on respective distances between coordinates of each of the plurality of strokes, determine a slope for each of the plurality of blocks, rotate an area including the plurality of strokes based on the determined slope, execute handwriting recognition on the plurality of strokes based on the rotated area, and display a result of the handwriting recognition on the display.

According to certain embodiments disclosed herein, in recognizing slanted handwriting input in a plurality of lines, the slanted handwriting may be analyzed by block-based linear regression to derive the slope thereof and may be subjected to preprocessing of rotation in a reverse direction, thereby increasing the recognition rate of the slanted writing input.

According to certain embodiments disclosed herein, in recognizing slanted handwriting input in a plurality of lines, the slanted handwriting may be subjected to grouping before analysis by block-based linear regression, thereby increasing the accuracy of rotation and increasing the recognition rate of the slanted writing input.

In addition, various effects directly or indirectly identified through this disclosure may be provided.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 illustrates an example in which an electronic device rotates an area corresponding to a first group based on a determined slope according to an embodiment;

In a description of the drawings, like reference numerals may be used to refer to like components.

DETAILED DESCRIPTION

Figure 1:
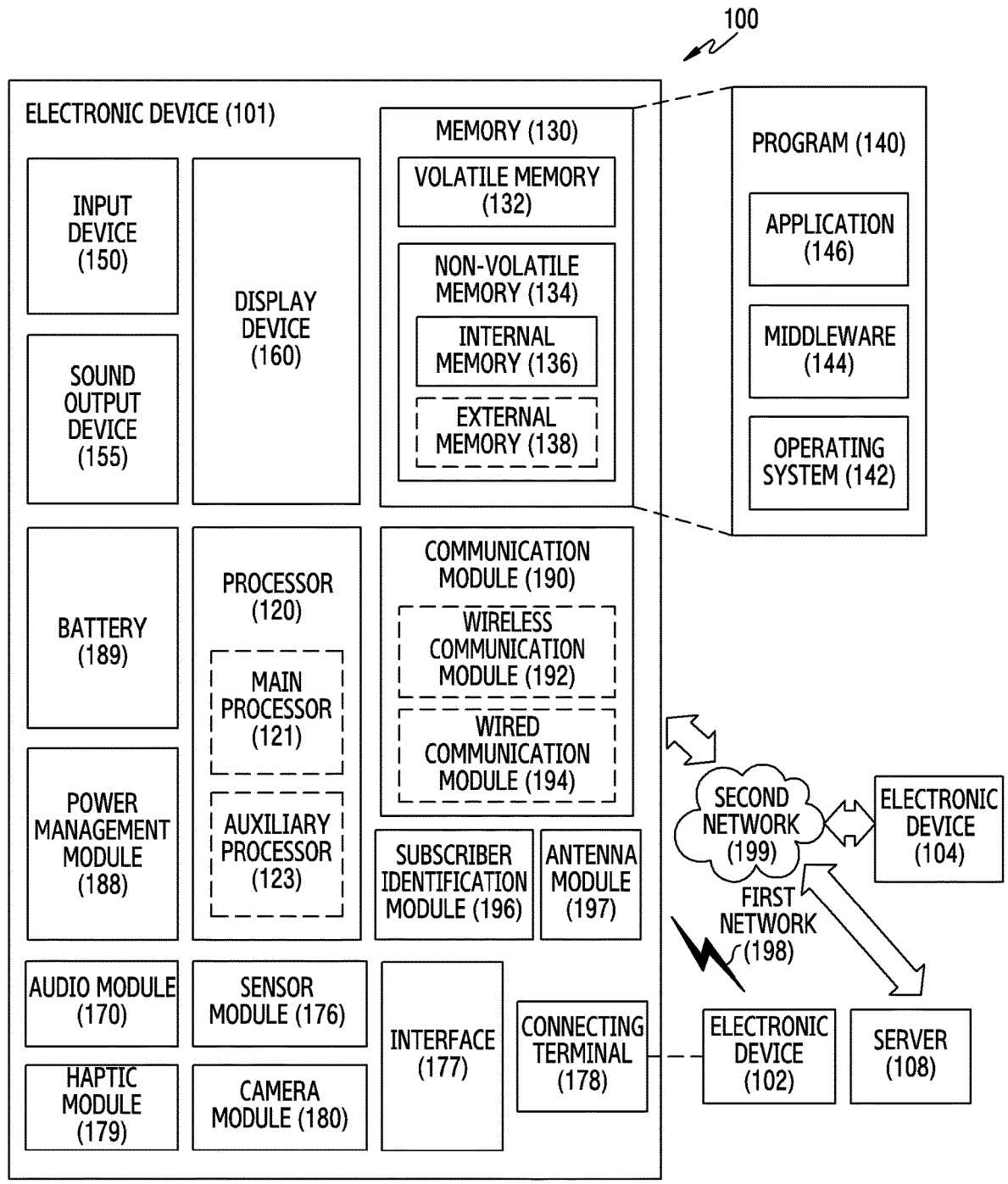
FIG. 1 is a block diagram illustrating an electronic device in a network environment according to certain embodiments.

Hereinafter, certain embodiments disclosed herein are described with reference to the accompanying drawings. The size of components illustrated in the drawings may be exaggerated or reduced for convenience of description, and the disclosure is not necessarily limited as illustrated.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
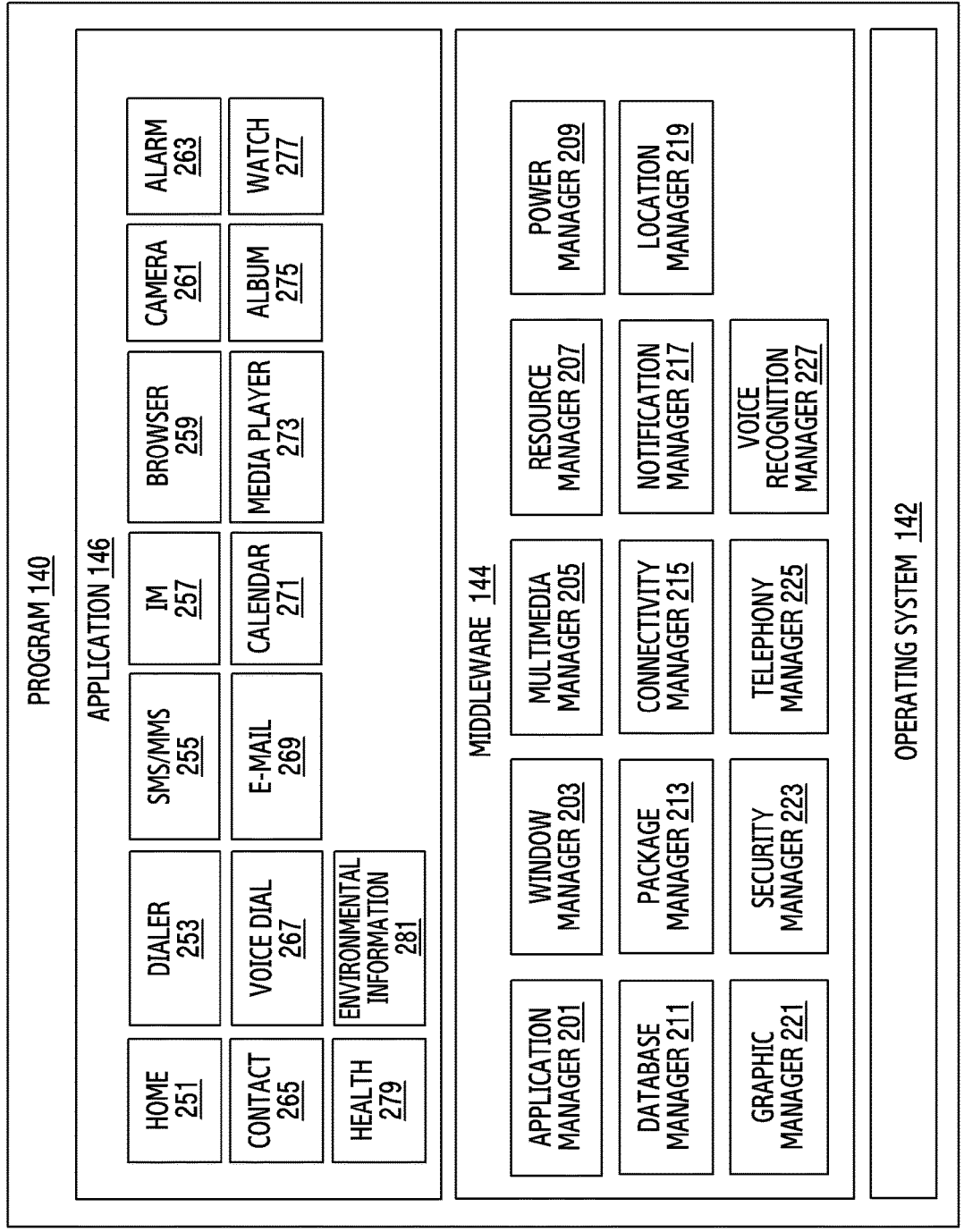
FIG. 2 is a block diagram illustrating a program according to certain embodiments.

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
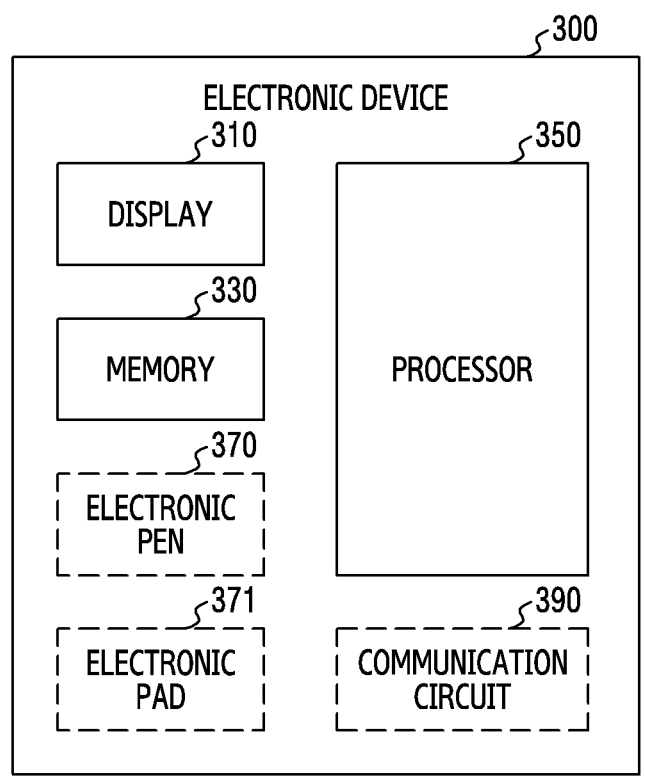
FIG. 3 is a block diagram illustrating an electronic device according to an embodiment.

FIG. 3 is a block diagram illustrating an electronic device 300 according to an embodiment. Referring to FIG. 3, the electronic device 300 (e.g., the electronic device 101 of FIG. 1) may obtain a writing input including a plurality of strokes on a display 310, may perform writing recognition in a rotated area via preprocessing of rotating the obtained strokes according to the degree of a tilt, and may output a recognition result through the display 310.

In an embodiment, as illustrated in FIG. 3, the electronic device 300 may include the display 310, a memory 330, a processor 350, an electronic pen 370, an electronic pad 371, and a communication circuit 390. However, the electronic device 300 is not limited to this configuration. According to an embodiment, the electronic device 300 may omit at least one of the foregoing components or may further include at least one different component. For example, the electronic device 300 may omit at least one of the electronic pen 370, the electronic pad 371, and the communication circuit 390.

The display 310 (e.g., the display device 160 of FIG. 1) may display various types of content (e.g., text, an image, a video, an icon, or a symbol). The display 310 may include a touchscreen and may receive a touch, gesture, proximity, or hovering input, for example, using an electronic pen or a user's body part. According to an embodiment, the display 310 may output the result of recognizing an obtained slanted writing input. The display 310 may display the path of the writing input on the screen corresponding to the path of a user's finger or an electronic pen on the screen of the display 310 (i.e., a path along which the user's finger or the electronic pen moves in contact with the screen).

In an embodiment, the display 310 may provide a rectangular screen. However, the shape of the screen provided by the display 310 is not limited to a rectangle but may include a rectangle having a rounded corner, a circle, a rectangle having a notched area, a rectangle having a circular hole in an area, or the like depending on the type or design of the electronic device. Although it is assumed in this document that the display has a rectangular shape and slanted writing is input in a horizontal direction of the display for convenience of explanation, various modifications are possible. For example, embodiments disclosed herein may also be applied to a case in which slanted writing is input in a vertical direction of the display.

In an embodiment, a slanted writing input or a writing input being slanted may mean that a series of writing inputs (e.g., a sentence, a word, or the like) are provided at a predetermined angle with respect to a reference direction (e.g., the horizontal direction) of the display. Here, the horizontal direction may refer to a direction that is the same as that of a first edge among edges forming the screen of the display 310. The first edge may correspond to a short edge (e.g., an edge corresponding to a width direction) in an embodiment, while the first edge may correspond to a long edge (e.g., an edge corresponding to a length direction) in another embodiment.

The memory 330 (e.g., the memory 130 in FIG. 1) may store various pieces of data used by at least one component of the electronic device 300. According to an embodiment, the memory 330 may store various pieces of data to recognize input slanted writing. According to an embodiment, the memory 330 may store at least one instruction associated with recognition of input slanted writing.

The processor 350 (e.g., the processor 120 of FIG. 1) may control at least one different component of the electronic device 300 and may perform various types of data processing or operations. According to an embodiment, the processor 350 may be electrically connected to the display 310 and the memory 330 and may execute instructions stored in the memory 330. According to an embodiment, the processor 350 may execute at least one instruction configured to perform an overall function of calculating an angle to rotate a writing input that is input at different angles per stroke, rotating the writing input, and recognizing writing based on a rotated area. When the instruction is executed by the processor 350, the processor 350 may perform the function corresponding to the instruction.

According to an embodiment, by executing the instruction, the processor 350 may obtain a writing input including a plurality of strokes on the display 310, may configure the strokes, and may group the strokes into a first group and a second group based on the coordinates of the plurality of strokes. The processor 350 may group first strokes included in the first group among the plurality of strokes into a plurality of blocks based on the distance between the coordinates of the strokes, may determine the slope of each block, and may rotate an area corresponding to the first group. The processor 350 may perform the foregoing pre-rotation process, thereby performing writing recognition of the first strokes based on the rotated area and displaying the result of the writing recognition on the display 310. A writing recognition method via a pre-rotation process will be described in detail later.

The electronic pen 370 (e.g., the input device 150 of FIG. 1) may recognize a user input through the electronic device 300. The electronic pad 371 (e.g., the input device 150 of FIG. 1) may detect an input by the electronic pen 370, and the processor 350 may be configured to detect the plurality of strokes through the electronic pad 371. For example, the electronic pad 371 may include an input detection circuit and may receive a writing input using the electronic pen 370 through the input detection circuit. The electronic pad 371 may include, for example, at least one of a touch panel or a digitizer. The touch panel may employ at least one of an electrostatic type, a pressure-sensitive type, an infrared type, and an ultrasonic type. The digitizer may detect the approach or touch of the electronic pen 370 supporting electromagnetic resonance (EMR). The digitizer may be configured as part of the touch panel or as a separate recognition sheet. According to an embodiment, at least one of the touch panel and the digitizer may be stacked to at least partially overlap a display panel of the display 310. The electronic pad 371 including at least one of the touch panel or the digitizer may be provided integrally with the display 310, in which case the electronic pad 371 and the display 310 may be referred to as a touchscreen display (or touchscreen).

The communication circuit 390 may support communication between the electronic device 300 and an external electronic device. According to an embodiment, the communication circuit 390 may receive data from the external electronic device or may transmit data to the external electronic device. According to another embodiment, the communication circuit 390 may transmit at least one of a writing input received via the electronic pen 370, data for recognizing the received writing input, or the result of recognizing the received writing input to the external electronic device.

Figure 4:
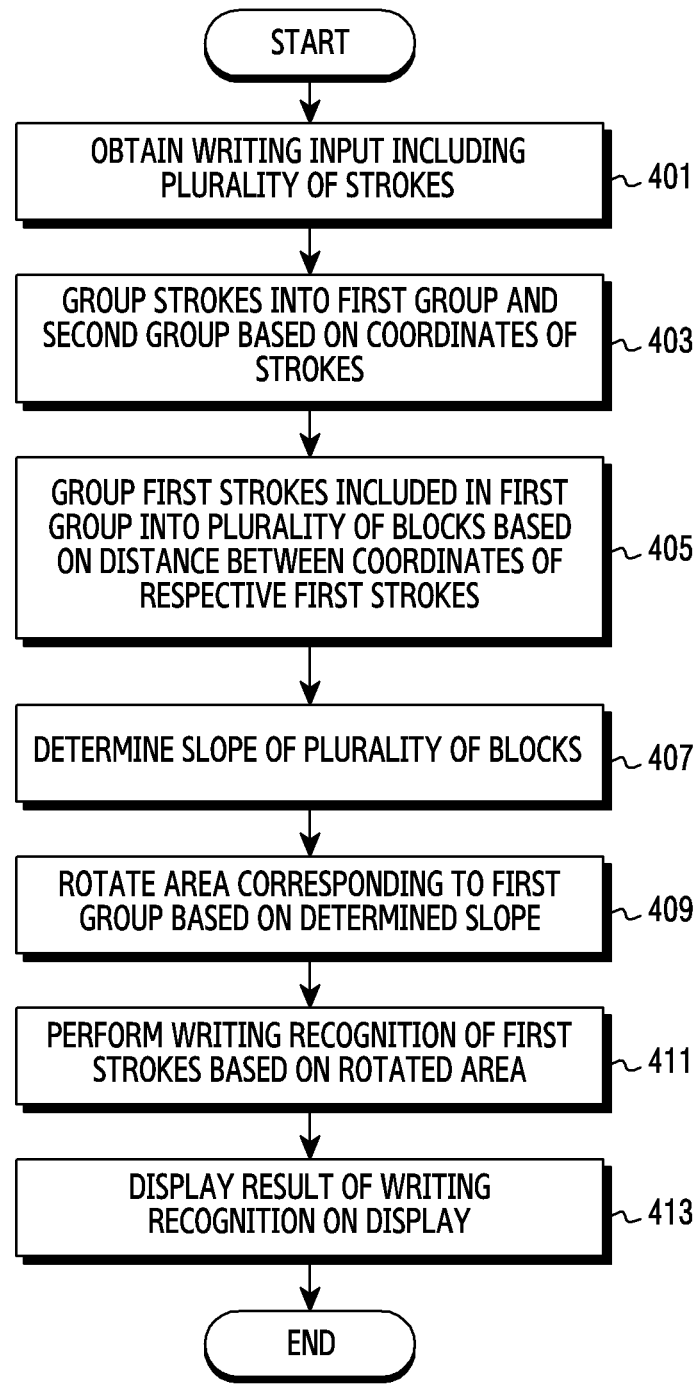
FIG. 4 is a flowchart illustrating a method in which an electronic device recognizes a slanted writing input according to an embodiment.

FIG. 4 is a flowchart illustrating a method in which an electronic device recognizes a slanted writing input according to an embodiment. Operations of FIG. 4 may be performed by the electronic device 300 of FIG. 3. Referring to FIG. 4, the processor 350 of the electronic device 300 according to an embodiment may perform operation 401 which includes obtaining a writing input (e.g., a handwritten input) including a plurality of strokes, operation 403 of grouping the strokes into a first group and a second group based on the coordinates of the strokes, operation 405 of grouping first strokes included in a first group among the strokes into a plurality of blocks based on the distance between the coordinates of the first strokes, operation 407 of determining the slopes of the plurality of blocks, operation 409 of rotating an area corresponding to the first group based on the determined slopes, operation 411 of performing writing recognition of the first strokes based on the rotated area, and operation 413 of displaying the result of the writing recognition on the display 310.

According to an embodiment, in operation 401, the processor 350 may obtain a writing input (e.g., handwritten text) including a plurality of strokes on the display 310. For example, the processor 350 may detect the writing input through the electronic pad 371 that detects the approach or touch of the electronic pen 370. According to an embodiment, the processor 350 may detect the writing input through a touch circuit (e.g., an electrostatic capacitive touch circuit, an electromagnetic induction touch circuit, or the like) included in the display 310.

According to an embodiment, in operation 403, the processor 350 may group the strokes into a first group and a second group based on the respective coordinates of the strokes. The processor 350 may determine to group the plurality of strokes into the groups according to positional similarity between the strokes. According to an embodiment, the processor 350 may analyze whether the strokes are spaced apart by at least a predetermined distance to be grouped into groups based on the coordinates of the strokes, and may group the strokes into one or more groups. For example, the plurality of inputted strokes may be grouped into one group, may be grouped into a first group and a second group, or may be grouped into three or more groups according to positional similarity.

According to an embodiment, the processor 350 may derive the average distance (average delta) between the plurality of strokes, and may group the strokes into groups when there is a gap of an n multiple of the average distance (average delta) based on the coordinates of the strokes. A relevant example will be described with reference to FIG. 5 and FIG. 6.

Figure 5:
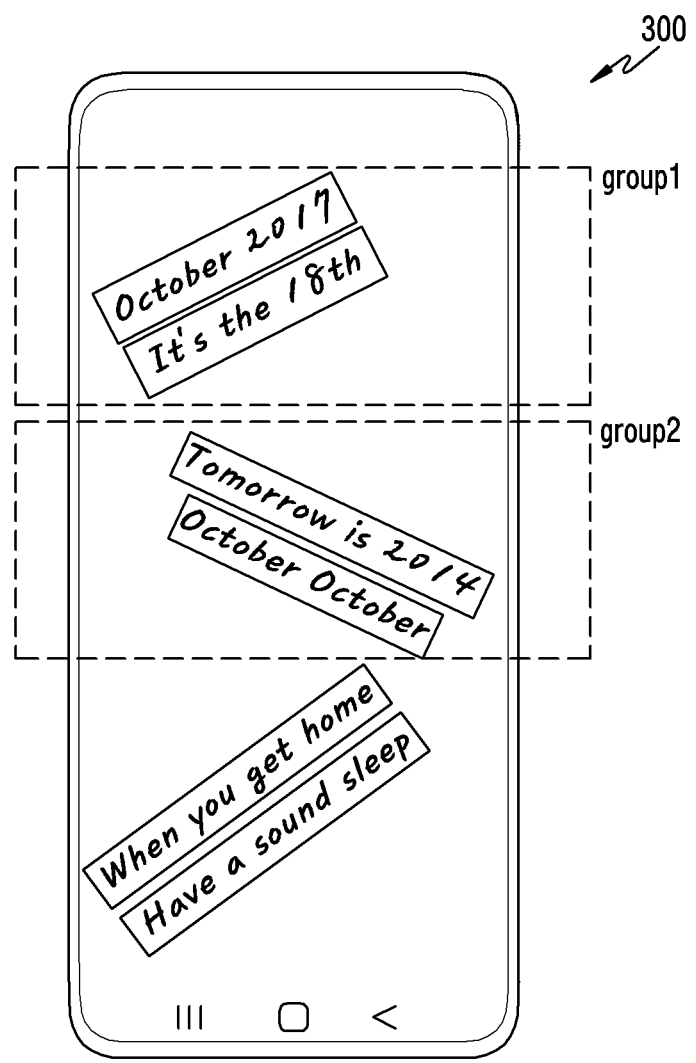
FIG. 5 illustrates a method in which an electronic device groups a plurality of strokes according to an embodiment.

FIG. 5 illustrates a method in which the electronic device 300 groups a plurality of strokes according to an embodiment. Referring to FIG. 5, handwriting marks writing indicating 'Oct. 18, 2019' may be grouped as a first group, and handwriting marks indicating 'Tomorrow is October, 2019' may be grouped as a second group. According to an embodiment, a method for deriving the average distance (average delta) between the plurality of strokes may employ a method used in the following block grouping operation 405.

Figure 6:
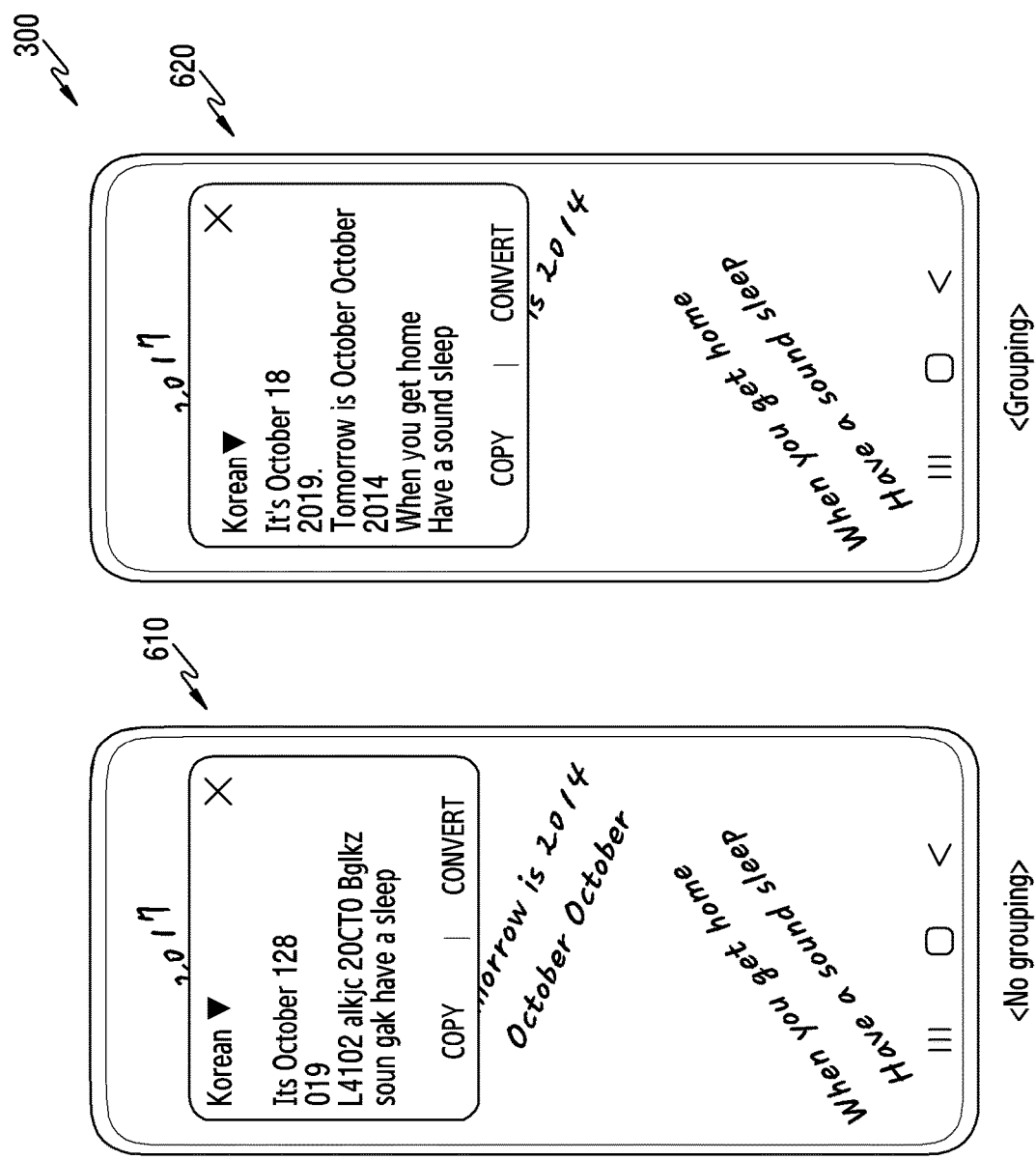
FIG. 6 illustrates a writing recognition result depending on whether an electronic device performs a grouping operation according to an embodiment.

FIG. 6 illustrates divergent handwriting recognition results, depending on whether the electronic device 300 performs the grouping operation 403 according to an embodiment. When the strokes are rotated per block without performing the grouping operation 403, the strokes may overlap depending on a rotation point, and thus errors may occur in handwriting recognition. Referring to FIG. 6, when the grouping operation 403 is not performed (610), an error occurs in a handwriting recognition resulting in a distorted textual output. In contrast, when the grouping operation 403 is performed (620), an accurate writing recognition result is produced.

According to an embodiment, when a stroke that is out of order is input, the processor 350 may use stored coordinate information about strokes in a preconfigured group to be quickly applied to the grouping operation 403.

A method for the grouping operation 403 is not limited to the above-described method, and any method using positional similarity is applicable. For example, the processor 350 may analyze images of the plurality of strokes and may group the images into one or more groups according to positional similarity.

Referring back to FIG. 4, in operation 405, the processor 350 according to an embodiment may group together a subset of the plurality of strokes (i.e., first strokes) based on the respective distances between the coordinates of the first strokes.

According to an embodiment, the distance between the coordinates may be derived by designating reference points on the first strokes for calculating the distance and obtaining the distance between the reference points. For example, the distance between the coordinates may be at least one of the distance between the start points of the first strokes, the distance between the end points of the first strokes, or the distance between intermediate points between the start points and the end points. According to an embodiment, the distance between the coordinates may be the distance between the end point of any one of the first strokes and the start point of a subsequent first stroke. A relevant example will be described with reference to FIG. 7.

Figure 7:
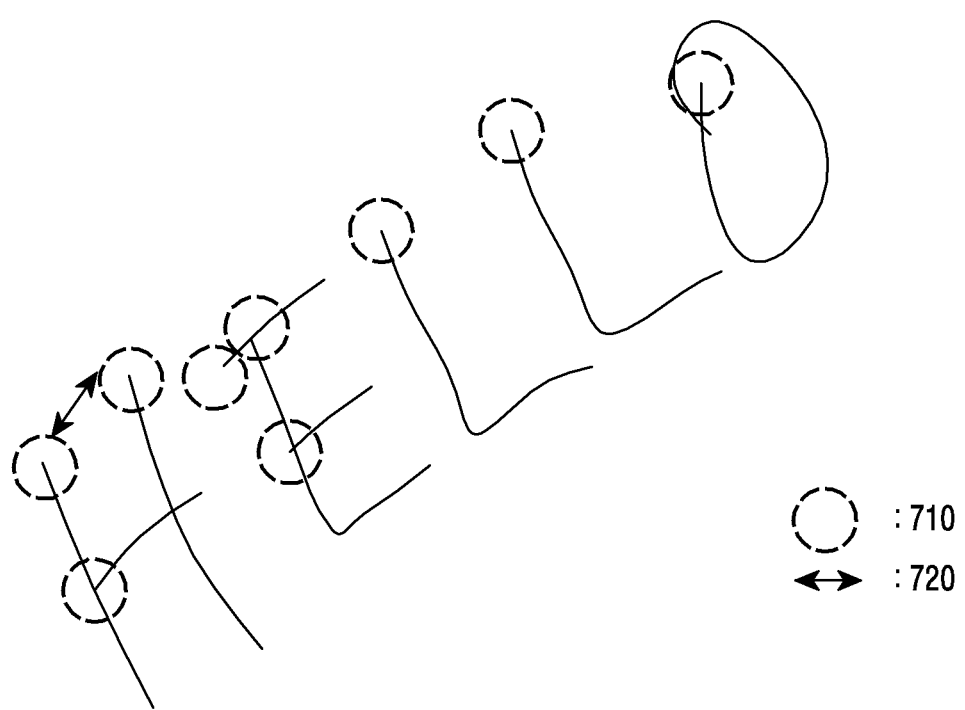
FIG. 7 illustrates a method in which an electronic device derives the distance between the start points of first strokes according to an embodiment.

FIG. 7 illustrates a method in which the electronic device 300 derives the distance between the start points of the first strokes according to an embodiment. In FIG. 7, the circular element labeled as 710 indicates each start point of each stroke of a writing input 'Hello', and arrow-element labeled as 720 indicates the distance between the start point of a first stroke and the start point of a second stroke. Referring to FIG. 7, the processor 350 may obtain the distance between the coordinates of the strokes by deriving the start points of the respective strokes forming the writing input 'Hello' and deriving the distance between the start points.

The processor 350 may group the strokes into one or more blocks based on the distance between the coordinates. According to an embodiment, the processor 350 may group the strokes into different blocks when any one distance between coordinates is equal to or greater than an n multiple of the average of derived distances between the coordinates. The variable "n" is a value greater than 1 and may be variously determined depending on the obtained writing input. A relevant example will be described with reference to FIG. 8.

Figure 8:
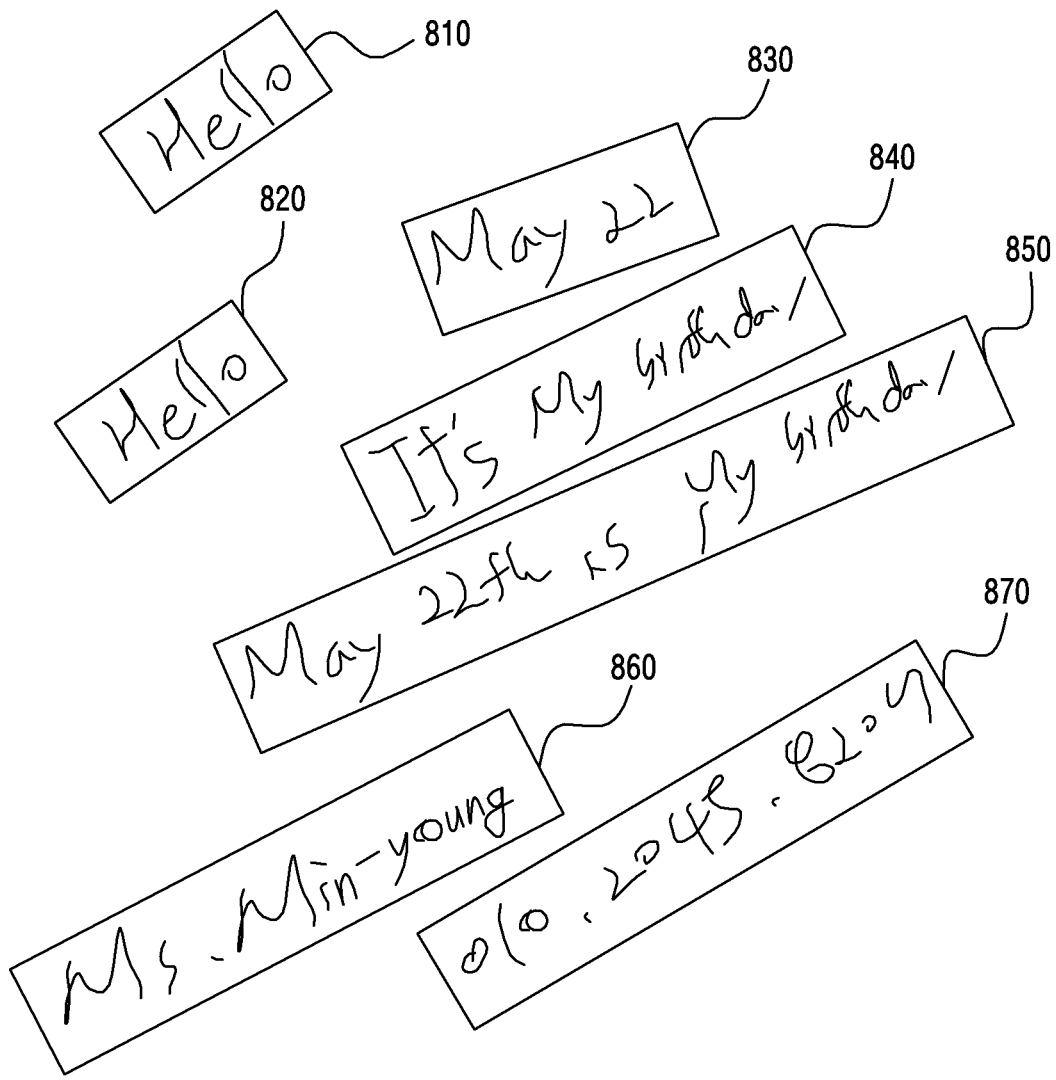
FIG. 8 illustrates a method in which an electronic device groups first strokes into a plurality of blocks according to an embodiment.

FIG. 8 illustrates a method in which the electronic device 300 groups the first strokes into a plurality of blocks according to an embodiment. The processor 350 may divide a writing input into a plurality of blocks 810, 820, 830, 840, 850, 860, 870 using the aforementioned block grouping method. Referring to FIG. 8, the processor 350 according to an embodiment may divide a writing input into seven blocks 810 to 870 based on the distance between the coordinates of strokes.

Referring back to FIG. 4, in operation 407, the processor 350 according to an embodiment may calculate the inclination angle of each of the separate blocks. The processor 350 may calculate the inclination angle of each separate block using a linear regression method. The processor 350 may use a block-based linear regression method, thereby solving problems that may occur in a conventional point-based linear regression method. For example, the processor 350 may accurately recognize writing even when a plurality of lines are input and there are a large number of spaces between words, the inclination angles of each of the lines are different, and/or the inclination angle of the writing is 60 degrees or greater. A relevant example will be described with reference to FIG. 9.

Figure 9:
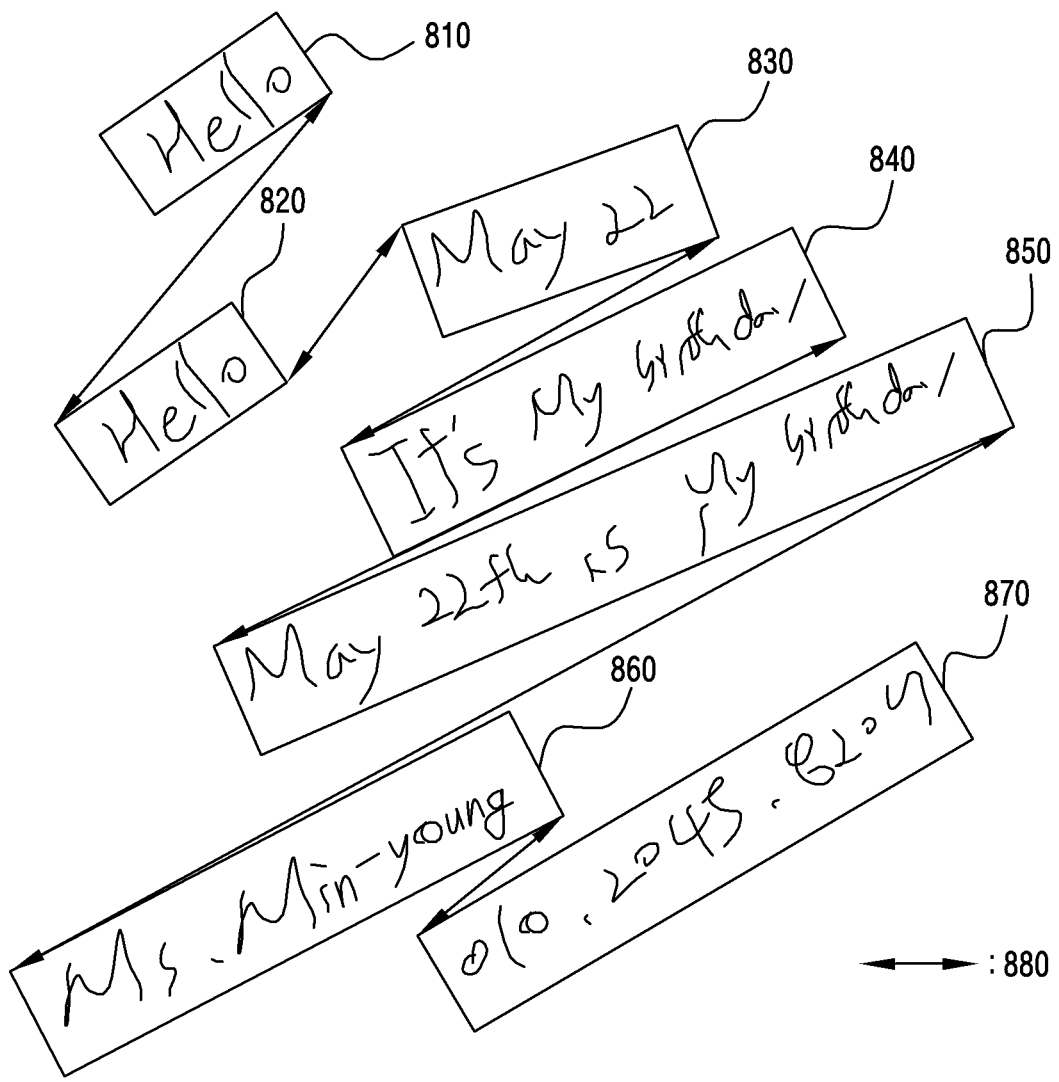
FIG. 9 illustrates a method in which an electronic device determines the slope of each block according to an embodiment.

FIG. 9 illustrates a method in which the electronic device 300 determines the slope of each block according to an embodiment. Referring to FIG. 9, the processor 350 may calculate the degree of inclination 880 for each of the separate blocks 810 to 870 in FIG. 8 using a linear regression method, thereby determining the slope of each of the blocks 810 to 870.

According to an embodiment, when performing operation 407 of determining the slopes of the plurality of blocks, the processor 350 may omit determination of slope for some blocks of which the angle is too difficult to calculate, from among the plurality of blocks. For example, a block having a very low aspect ratio may be excluded from slope determination.

Referring back to FIG. 4, in operation 409, the processor 350 according to an embodiment may rotate an area corresponding to the first group based on the determined slopes. The rotation angle of the area may be an average value of the inclination angles for each of the blocks in the first group determined by the linear regression method.

According to an embodiment, when obtaining the average value of the inclination angles of the blocks, the processor 350 may exclude the inclination angle of any block deemed unnecessary for calculating the rotation angle. For example, a relatively small block (e.g., a black having insufficient length compared to a predetermined length), a block slanted at an angle that is significantly different from the inclination angles of other blocks (e.g., having a differentiation greater than some preset angular threshold), or the like may be excluded from the process of obtaining the average value of the inclination angles.

Referring back to FIG. 4, in operation 409 of rotating the area, the processor 350 may rotate the entire area corresponding to the first group by the obtained average value in a reverse direction. According to an embodiment, the processor 350 may rotate the first group in the opposite direction of the inclination angles, thereby adjusting the slanted writing input. According to an embodiment, the processor 350 may rotate the entire first group by the same angle (e.g., the average value), thereby preventing strokes in the first group from overlapping due to the rotation. A relevant example will be described with reference to FIG. 10.

FIG. 10 illustrates an example in which the electronic device 300 rotates the area corresponding to the first group based on the determined slopes according to an embodiment. Referring to FIG. 10, the processor 350 may rotate the entire area corresponding to the blocks 810 to 870 by the average value of inclination angles of the respective blocks 810 to 870 determined in FIG. 9.

According to an embodiment, the processor 350 may rotate an area corresponding to the second group by the average value of inclination angles of blocks in the second group by the same method as the foregoing method for rotating the first group. The rotation angle of the first group and the rotation angle of the second group may be different.

According to an embodiment, in operation 409 of rotating the area, the processor 350 may rotate the area corresponding to the first group excluding at least one block that does not require rotation among the plurality of blocks. For example, a block that is slanted at a small angle not to significantly affect writing recognition performance (e.g., being slanted at an angle smaller than some predetermined angular threshold) and thus does not require rotation may be excluded from the rotation.

Referring back to FIG. 4, in operation 411, the processor 350 according to an embodiment may perform writing recognition of the first strokes based on the rotated area. The writing recognition operation 411 may use a conventional method. Hereinafter, the overall flow of operation 401 to operation 411 will be described with reference to FIG. 11.

Figure 11:
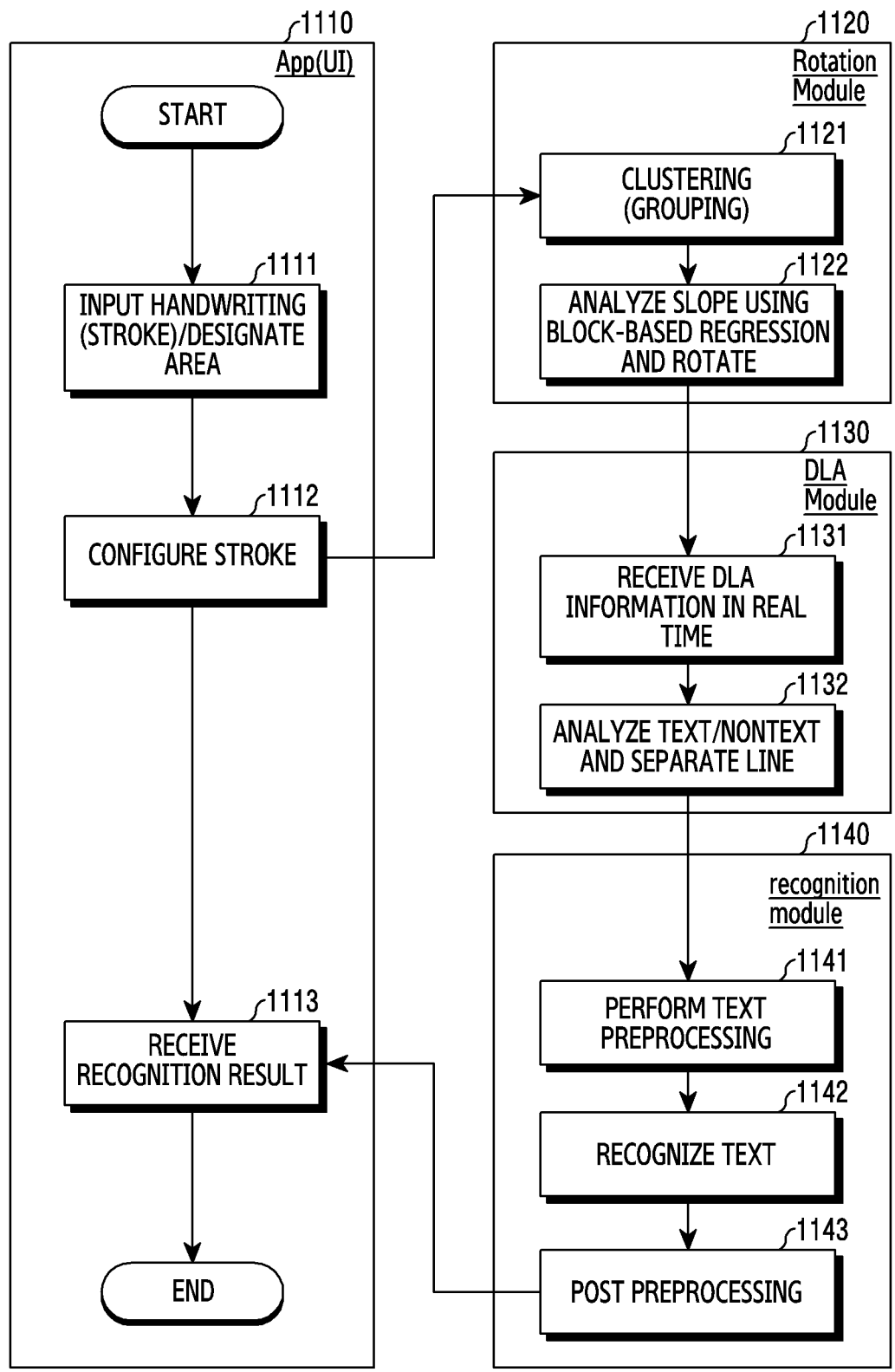
FIG. 11 schematically illustrates an overall flow in which an electronic device recognizes slanted writing according to an embodiment.

FIG. 11 schematically illustrates an overall flow in which the electronic device 300 recognizes slanted writing according to an embodiment. Referring to FIG. 11, a process in which the electronic device 300 recognizes slanted writing may be performed in an app (UI) 1110, a rotation module 1120, a document layout analysis (DLA) module 1130, and a recognition module 1140. According to an embodiment, the processor may obtain a writing input including a plurality of strokes in the app (UI) 1110 (1111) and may configure the strokes (1112). According to an embodiment, the processor may group the configured strokes according to positional similarity (1121), analyze the slopes of strokes in a group based on a block, and rotate the strokes (1122) in the rotation module 1120. According to an embodiment, the processor may analyze DLA information about the rotated strokes in real time (1131), parse the strokes into text and non-text, and separate strokes of the text into lines (1132) in the DLA module 1130. According to an embodiment, the processor may perform text preprocessing (1141), recognize the text (1142), and perform post processing (1143) in the recognition module 1140.

According to an embodiment, in DLA information analysis (1131), the processor may classify handwritten text and non-text (e.g., a picture) by DLA in real time. According to an embodiment, in DLA information analysis (1131), the processor may classify the input strokes in real time according to the learning result of learning data of the handwritten text and the non-text (e.g., the picture).

According to an embodiment, in stroke separation (1132), the processor may separate the strokes in a group classified as the text in real time. According to an embodiment, stroke separation (1132) may be performed according to a rule (e.g., the order of handwritten strokes, an input position, or the like) in order to increase speed.

According to an embodiment, in text recognition (1142), the processor may perform text recognition using a writing recognition algorithm (e.g., a database in tandem with recognition strategies based on machine learning). The processor may generate text with the highest probability of accuracy translation of the handwritten text through various methodologies in post processing (1143). The derived text (i.e., recognition result) may be received in the app (UI) 1110 (1113) and may be displayed.

Figure 12:
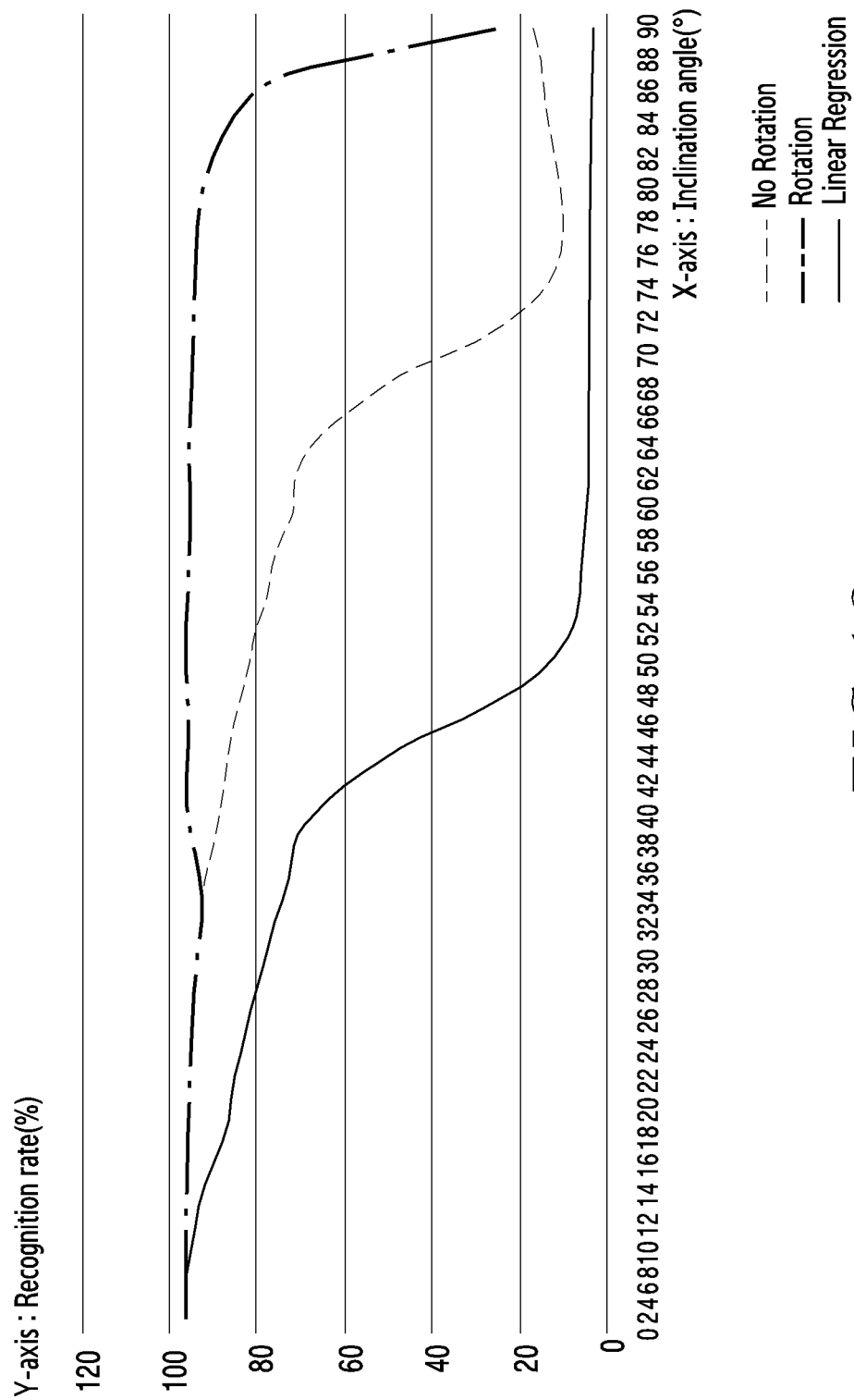
FIG. 12 is a graph illustrating a writing recognition rate depending on whether an electronic device rotates a slanted writing input according to an embodiment.

FIG. 12 is a graph illustrating a writing recognition rate depending on whether the electronic device 300 rotates a slanted writing input according to an embodiment, and FIG.

Figure 13:
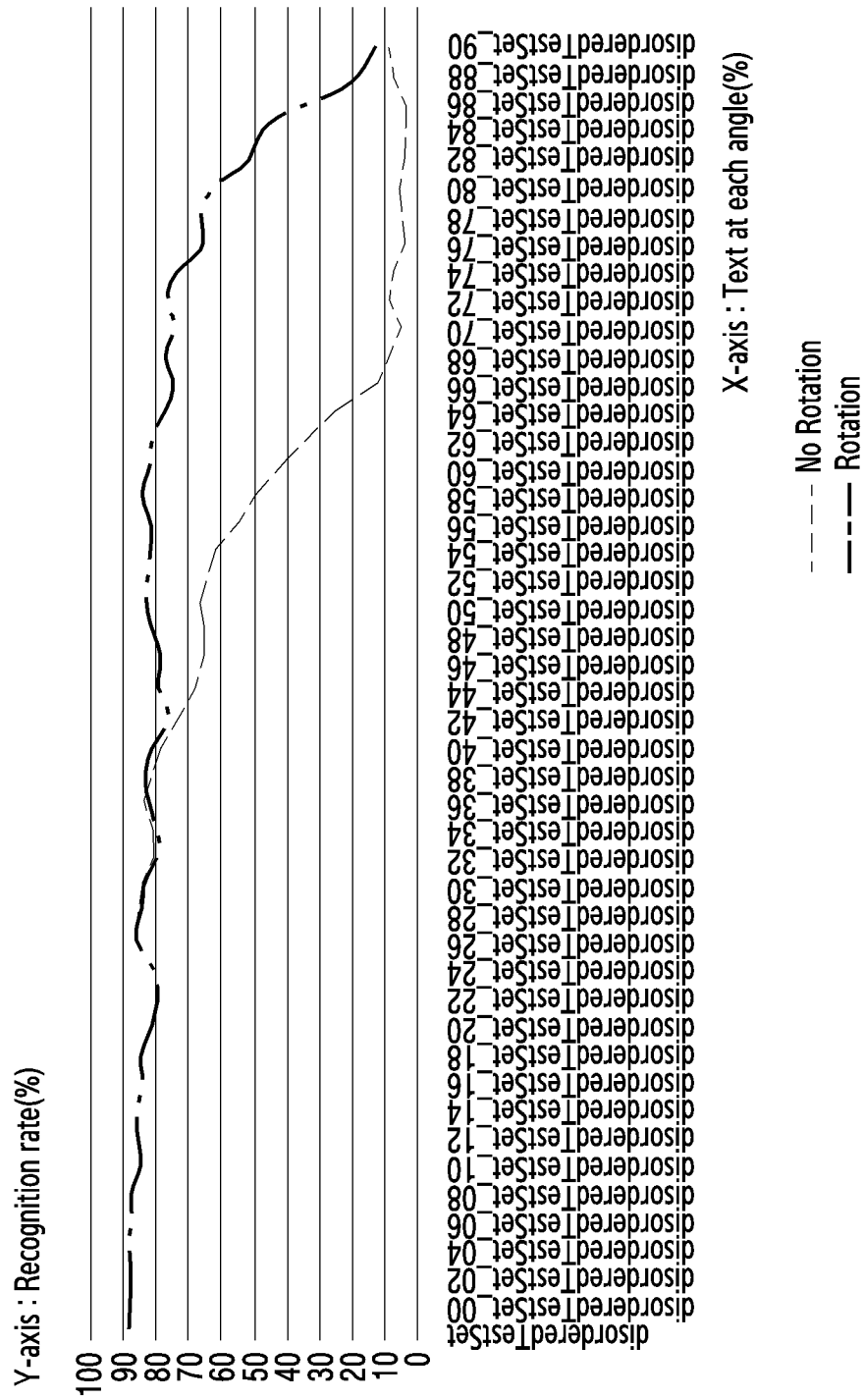
FIG. 13 is a graph illustrating a writing recognition rate depending on whether an electronic device rotates a disordered writing input according to an embodiment.

13 is a graph illustrating a writing recognition rate depending on whether the electronic device rotates a disordered writing input according to an embodiment. Referring to FIG. 12, when no rotation is performed, an error occurs in a recognition result due to a limitation of internal line separation logic. In FIG. 12, when no rotation is performed, writing slanted at about 30 degrees shows a recognition rate of about 90%, writing slanted at about 70 degrees shows a recognition rate of about 20%, and writing slanted at about 80 degrees shows a recognition rate of about 10% or less. However, when rotation is performed, writing slanted at about 80 degrees shows a recognition rate of about 90%. According to the conventional point-based linear regression method, even though writing is slanted at 20 degrees, the recognition rate is about 80% or less. Referring to FIG. 13, in a condition of the disordered writing input (e.g., when the last stroke or a specific word is belatedly written), the recognition rate is also higher when rotation is performed than when no rotation is performed.

Referring back to FIG. 4, in operation 413, the processor 350 according to an embodiment may display the result of writing recognition on the display 310. According to an embodiment, the processor 350 may display the result value of recognizing a slanted writing input and converting the writing input into text on the display 310. Accordingly, the display 310 may display the converted text result value in real time on the screen.

The processor 350 disclosed herein may display the result of recognizing slanted writing on the display 310 in various ways. For example, the processor 350 may display not only a converted text result value but also other information. A relevant example will be described with reference to FIG. 14 to FIG. 16.

Figure 14:
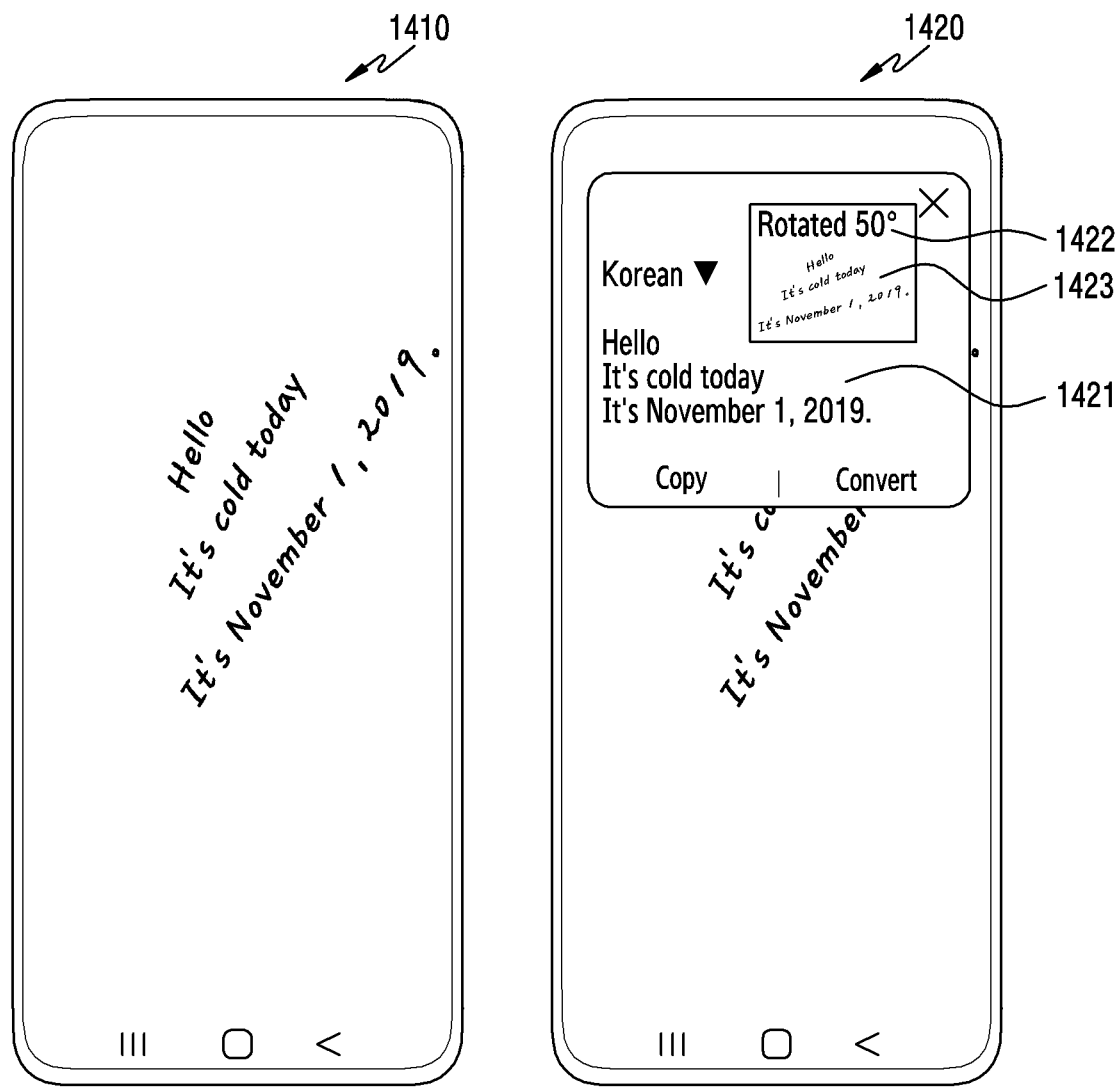
FIG. 14 illustrates a method in which an electronic device displays the result of recognizing slanted writing according to an embodiment.
Figure 15:
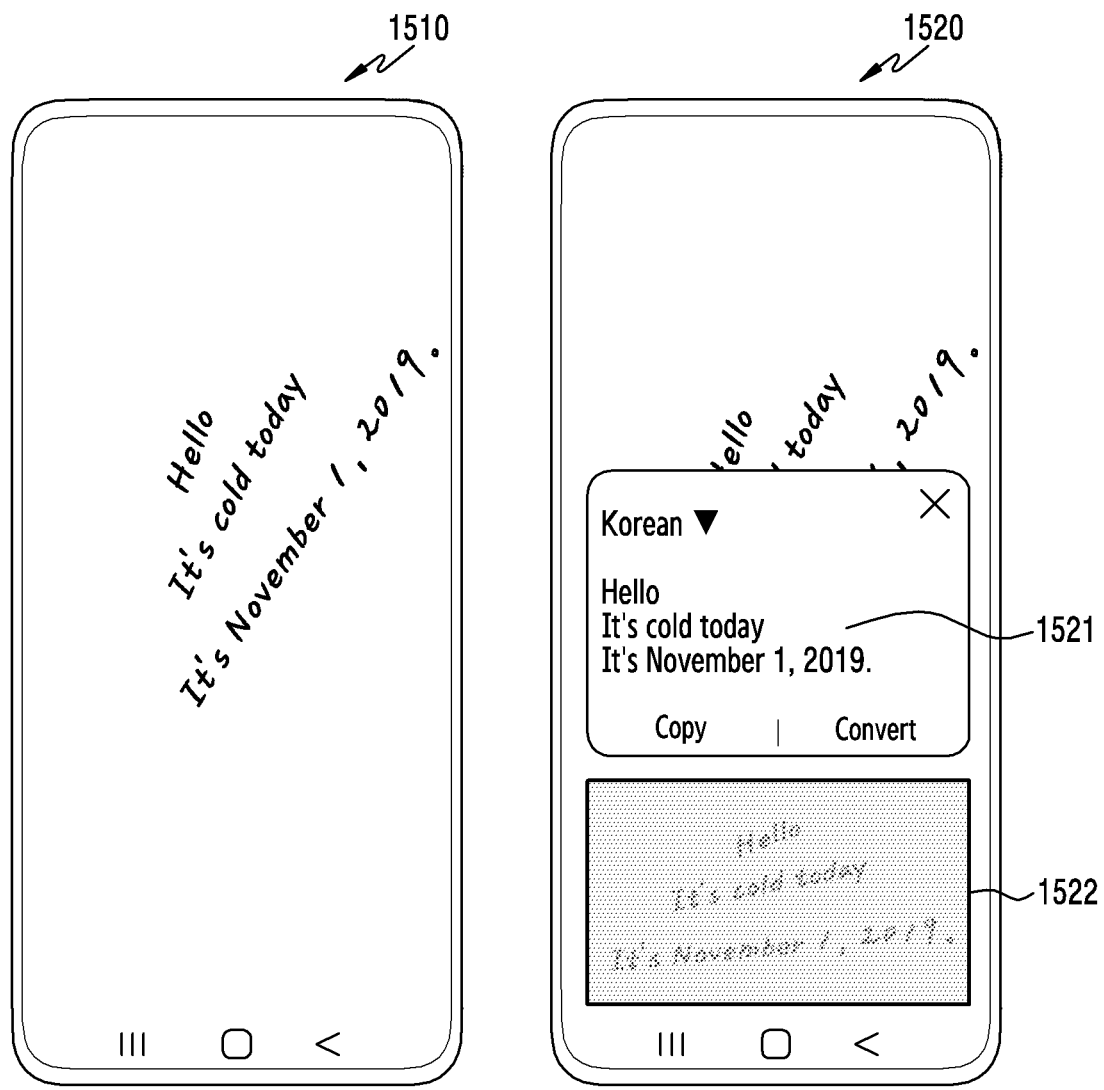
FIG. 15 illustrates a method in which an electronic device displays the result of recognizing slanted writing according to an embodiment.
Figure 16:
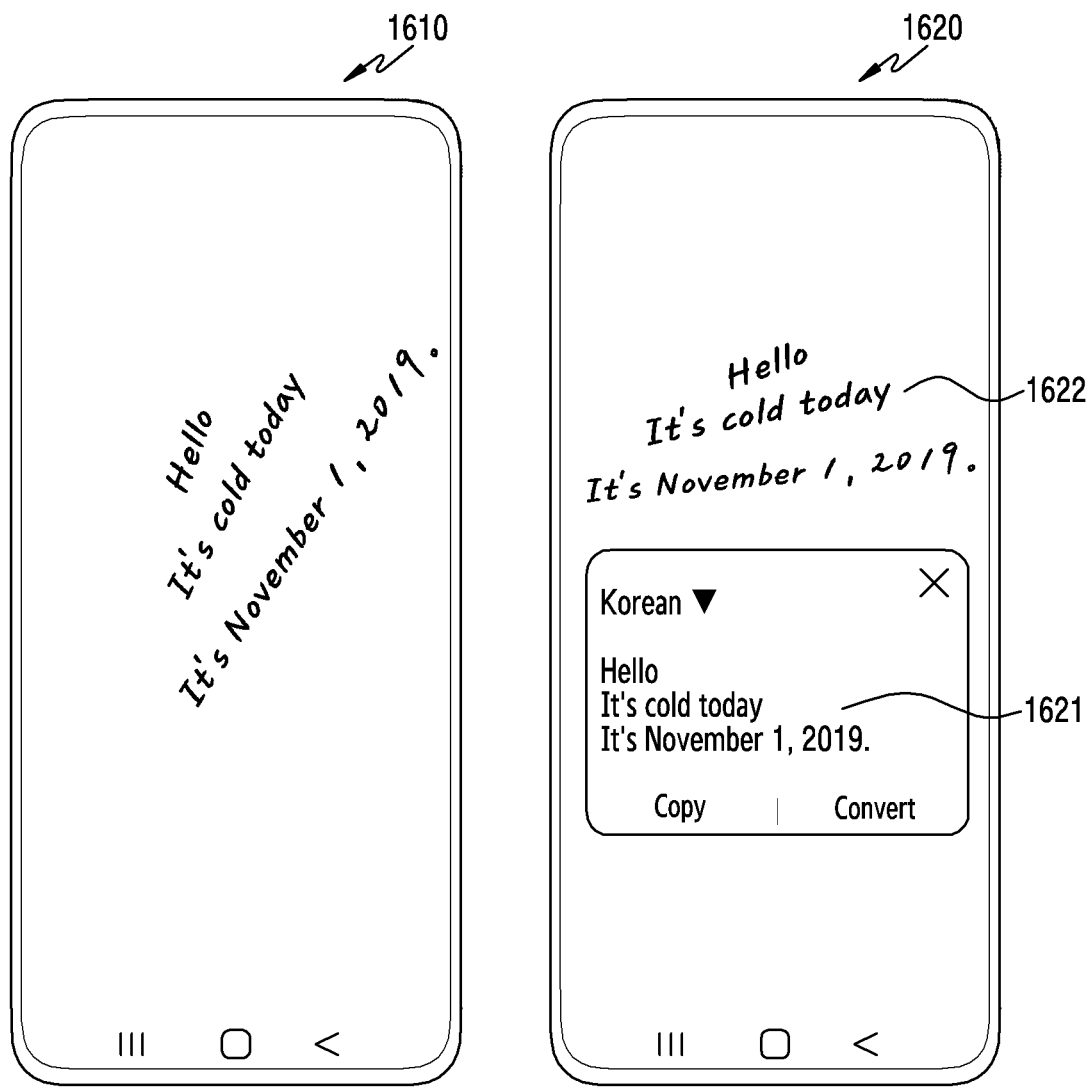
FIG. 16 illustrates a method in which an electronic device displays the result of recognizing slanted writing according to an embodiment.

FIG. 14 illustrates a method in which an electronic device displays the result of execution algorithmic text recognition on slanted writing according to an embodiment, FIG. 15 illustrates a method in which an electronic device displays the result of recognizing slanted writing according to an embodiment, and FIG. 16 illustrates a method in which an electronic device displays the result of recognizing slanted writing according to an embodiment.

Referring to FIG. 14, the processor 350 may display the inclination angle of a writing input and an image of the writing input in a thumbnail format together on the display 310. In FIG. 14, 1410 indicates an original slanted writing input, and 1420 indicates an example of displaying text 1421 derived by an operation of the processor 350 along with the inclination angle 1422 of the writing input and a writing input image 1423 in a thumbnail format.

Referring to FIG. 15, the processor 350 may also display a translucent writing input image on the display 310. In FIG. 15, 1510 indicates an original slanted writing input, and 1520 indicates an example of displaying text 1521 derived by an operation of the processor 350 along with a translucent writing input image 1522.

Referring to FIG. 16, the processor 350 may change an original slanted writing input into a rotated result and may display the rotated result on the display 310. In FIG. 16, 1610 indicates an original slanted writing input, and 1620 indicates an example of displaying a rotated image 1622 into which the original writing input is changed along with text 1621 derived by an operation of the processor 350.

A method for outputting a result value on the display 310 is not limited to the foregoing embodiments, and the result of recognizing a slanted writing input may be displayed by various methods.

As described above, according to an embodiment, a method for recognizing a slanted writing input by an electronic device (e.g., the electronic device 101 of FIG. 1 or the electronic device 300 of FIG. 3) may include: an operation of obtaining a writing input including a plurality of strokes on a display (e.g., operation 401 of FIG. 4); an operation of grouping the plurality of strokes into a first group and a second group based on coordinates of the plurality of strokes (e.g., operation 403 of FIG. 4); an operation of grouping first strokes included in the first group among the plurality of strokes into a plurality of blocks based on a distance between coordinates of the respective first strokes (e.g., operation 405 of FIG. 4); an operation of determining a slope of each of the plurality of blocks (e.g., operation 407 of FIG. 4); an operation of rotating an area corresponding to the first group based on the determined slope (e.g., operation 409 of FIG. 4); and an operation of performing writing recognition of the first strokes based on the rotated area (e.g., operation 411 of FIG. 4).

According to an embodiment, in the operation of grouping the plurality of strokes into the first group and the second group, the at least one processor may determine to group the plurality of strokes into the first group and the second group according to positional similarity between the plurality of strokes.

According to an embodiment, the distance between the coordinates may be at least one of a distance between start points of the first strokes, a distance between end points of the first strokes, or a distance between intermediate points between the start points and the end points.

According to an embodiment, the distance between the coordinates may be a distance between an end point of any one of the first strokes and a start point of a subsequent first stroke.

According to an embodiment, in the operation of determining the slope, the at least one processor may determine the slope of each of the plurality of blocks using linear regression.

According to an embodiment, an angle by which the area is rotated may be an average of inclination angles of the plurality of blocks.

According to an embodiment, in the operation of rotating the area, the at least one processor may rotate the entire area corresponding to the first group in a reverse direction by the average of the inclination angles of the plurality of blocks.

According to an embodiment, in the operation of rotating the area, the at least one processor may rotate the area corresponding to the first group excluding at least one block not needing rotation among the plurality of blocks.

As described above, according to an embodiment, an electronic device 300 (e.g., the electronic device 101 of FIG. 1) may include: a display 310 (e.g., the display device 160 of FIG. 1); a memory 330 (e.g., the memory 130 of FIG. 1) configured to store instructions; an electronic pen 370 (e.g., the input device 150 of FIG. 1) configured to be recognized by the electronic device 300; and at least one processor 350 (e.g., the processor 120 of FIG. 1) configured to be electrically connected to the display 310 and the memory 330, in which the at least one processor 350 may be configured to: obtain a writing input including a plurality of strokes using the electronic pen 370 (e.g., operation 401 of FIG. 4); group the plurality of strokes into a plurality of blocks based on a distance between coordinates of the plurality of respective strokes (e.g., operation 405 of FIG. 4); determine a slope of each of the plurality of blocks (e.g., operation 407 of FIG. 4); rotate an area including the plurality of strokes based on the determined slope (e.g., operation 409 of FIG. 4); perform writing recognition of the plurality of strokes based on the rotated area (e.g., operation 411 of FIG. 4); and display a result of the writing recognition on the display 310 (e.g., operation 413 of FIG. 4).

According to an embodiment, the electronic device 300 may further include an electronic pad (an electromagnetic resonance or EMR pad) 371 configured to detect an input by the electronic pen, in which the at least one processor 350 may be configured to detect the plurality of strokes through the electronic pad 371.

According to an embodiment, the electronic device 300 may further include: an accommodation space configured to accommodate the electronic pen 370; and a sensor configured to detect whether the electronic pen 370 is detached from the accommodation space.

According to an embodiment, the electronic device 300 may further include a communication circuit 390 configured to support communication between the electronic device 300 and an external electronic device, in which the communication circuit 390 may receive data from the external electronic device or may transmit data to the external electronic device.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a display;
a memory configured to store instructions; and
at least one processor electrically connected to the display and the memory,
wherein, the stored instructions are executable by the at least one processor to cause the electronic device to:
detect a written input including a plurality of strokes through the display;
group the plurality of strokes into a first group and a second group based on respective coordinates of each of the plurality of strokes;

group first strokes included in the first group into a plurality of blocks, based on a distance between respective coordinates of each of the first strokes, wherein the first strokes form multiple characters;
determine a plurality of inclination angles for the plurality of blocks of the first group;
rotate an area corresponding to an entirety of the first group including the plurality of blocks associated with the first strokes by an average value of the plurality of inclination angles of the plurality of blocks of the first group, wherein an inclination angle of the first group is different than an inclination angle of the second group, such that the rotation of the area corresponding to the entirety of the first group is different from a rotation of an area corresponding to an entirety of the second group;
execute handwriting recognition on the first strokes based on the rotated area; and
display a result of the handwriting recognition on the display including the inclination angle of the first strokes in the first group.

2. The electronic device of claim 1, wherein the plurality of strokes are grouped into the first group and the second group according to positional similarity between each of the plurality of strokes.

3. The electronic device of claim 1, wherein the distance between each of the respective coordinates is based on at least one of:
a distance between start points of each of the first strokes,
a distance between end points of each the first strokes, and
a distance between intermediate points of each of the first strokes, wherein the intermediate points are disposed between the start points and the end points.

4. The electronic device of claim 1, wherein the distance between the coordinates is based on a distance between an end point of one of the first strokes and a start point of a subsequent first stroke.

5. The electronic device of claim 1, wherein the plurality of inclination angles of the plurality of blocks is determined using linear regression.

6. The electronic device of claim 1, wherein rotating the area further includes rotating an entirety of the area corresponding to the first group in a reverse direction according to the average value of the plurality of inclination angles of the plurality of blocks.

7. The electronic device of claim 1, wherein rotating the area corresponding to the first group excludes at least one block from among the plurality of blocks for which rotation is determined to be unnecessary.

8. A method in an electronic device, the method comprising:
detecting, through a display, a handwritten input including a plurality of strokes;
grouping, by a processor, the plurality of strokes into a first group and a second group based on respective coordinates of each the plurality of strokes;
grouping first strokes included in the first group from among the plurality of strokes into a plurality of blocks based on a distance between coordinates of each of the respective first strokes, wherein the first strokes form multiple characters;
determining a plurality of inclination angles for the plurality of blocks of the first group;
rotating an area corresponding to an entirety of the first group including the plurality of blocks associated with the first strokes by an average value of the plurality of inclination angles of the plurality of blocks of the first group, wherein an inclination angle of the first group is different than an inclination angle of the second group, such that the rotation of the area corresponding to the entirety of the first group is different from a rotation of an area corresponding to an entirety of the second group;
executing handwriting recognition on the first strokes based on the rotated area; and
displaying a result of the handwriting recognition on the display including the inclination angle of the first strokes in the first group.

9. The method of claim 8, wherein the plurality of strokes are grouped into the first group and the second group according to positional similarity between each of the plurality of strokes.

10. The method of claim 8, wherein the distance between each of the respective coordinates is based on at least one of:
a distance between start points of each of the first strokes,
a distance between end points of each the first strokes, and
a distance between intermediate points of each of the first strokes, wherein the intermediate points are disposed between the start points and the end points.

11. The method of claim 8, wherein the distance between the coordinates is based on a distance between an end point of one of the first strokes and a start point of a subsequent first stroke.

12. The method of claim 8, wherein the plurality of inclination angles of the plurality of blocks is determined using linear regression.

13. The method of claim 8, wherein rotating the area further includes rotating an entirety of the area corresponding to the first group in a reverse direction according to the average value of the plurality of inclination angles of the plurality of blocks.

14. The method of claim 8, wherein rotating the area corresponding to the first group excludes at least one block from among the plurality of blocks for which rotation is determined to be unnecessary.

15. An electronic device, comprising:
a display;
a memory storing instructions;
an electronic pen detectable by the electronic device; and
at least one processor electrically connected to the display and the memory,
wherein the instructions are executable by the at least one processor to cause the electronic device to:
detect a written input including a plurality of strokes via the electronic pen;
group the plurality of strokes into a first group and a second group based on respective coordinates of each of the plurality of strokes;
group first strokes included in the first group into a plurality of blocks, based on a distance between respective coordinates of each of the first strokes, wherein the first strokes form multiple characters;
determine a plurality of inclination angles for the plurality of blocks of the first group;
rotate an area corresponding to an entirety of the first group including the plurality of blocks associated with the first strokes by an average value of the plurality of inclination angles of the plurality of blocks of the first group, wherein an inclination angle of the first group is different than an inclination angle of the second group, such that the rotation of the area corresponding to the entirety of the first group is different from a rotation of an area corresponding to an entirety of the second group;

execute handwriting recognition on the first strokes based on the rotated area; and display a result of the handwriting recognition on the display including the inclination angle of the first strokes in the first group.

16. The electronic device of claim 15, further including an electronic pad configured to detect an input by the electronic pen, wherein the at least one processor is configured to detect the plurality of strokes through the electronic pad.

17. The electronic device of claim 15, further comprising:

an accommodation space for housing the electronic pen; and a sensor configured to detect whether the electronic pen is disposed within the accommodation space, or removed from within the accommodation space.

18. The electronic device of claim 15, further comprising a communication circuit providing communication between the electronic device and an external electronic device, wherein the communication circuit receives data from the external electronic device and/or transmits data to the external electronic device.

\* \* \* \* \*